United States Patent
Sloterbeek et al.

(10) Patent No.: US 9,327,648 B2
(45) Date of Patent: May 3, 2016

(54) REARVIEW ASSEMBLY WITH EXPOSED CARRIER PLATE

(71) Applicant: Gentex Corporation, Zeeland, MI (US)

(72) Inventors: Eric S. Sloterbeek, Hudsonville, MI (US); Steven G. Hoek, Holland, MI (US); William M. Vanden Bos, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 139 days.

(21) Appl. No.: 14/147,369

(22) Filed: Jan. 3, 2014

(65) Prior Publication Data

US 2014/0192431 A1 Jul. 10, 2014

Related U.S. Application Data

(60) Provisional application No. 61/749,012, filed on Jan. 4, 2013.

(51) Int. Cl.
*B60R 1/04* (2006.01)
*B60R 1/12* (2006.01)
*B60R 1/02* (2006.01)

(52) U.S. Cl.
CPC ... *B60R 1/04* (2013.01); *B60R 1/12* (2013.01); *B60R 1/02* (2013.01)

(58) Field of Classification Search
CPC ............... B60R 1/12; B60R 1/02; B60R 1/04
USPC .......................................... 362/494; 359/871
See application file for complete search history.

(56) References Cited

U.S. PATENT DOCUMENTS

| | | | |
|---|---|---|---|
| 3,280,701 A | 10/1966 | Donnelly et al. | |
| 3,713,726 A * | 1/1973 | Magi | 359/871 |
| 3,837,129 A | 9/1974 | Losell | |
| 4,902,108 A | 2/1990 | Byker | |
| 5,052,163 A | 10/1991 | Czekala | |
| 5,066,112 A | 11/1991 | Lynam et al. | |
| 5,069,535 A | 12/1991 | Baucke et al. | |
| 5,073,012 A | 12/1991 | Lynam | |
| 5,076,673 A | 12/1991 | Lynam et al. | |
| 5,115,346 A | 5/1992 | Lynam | |
| 5,128,799 A | 7/1992 | Byker | |
| 5,151,824 A | 9/1992 | O'Farrell | |
| 5,158,638 A | 10/1992 | Osanami et al. | |
| 5,253,109 A | 10/1993 | O'Farrell et al. | |
| 5,278,693 A | 1/1994 | Theiste | |
| 5,280,380 A | 1/1994 | Byker | |
| 5,282,077 A | 1/1994 | Byker | |
| 5,294,376 A | 3/1994 | Byker | |
| 5,336,448 A | 8/1994 | Byker | |
| 5,379,146 A | 1/1995 | Defendini | |
| 5,421,940 A | 6/1995 | Cornils et al. | |

(Continued)

*Primary Examiner* — Bumsuk Won
*Assistant Examiner* — Wiliam R Alexander
(74) *Attorney, Agent, or Firm* — Price Heneveld LLP; Scott P. Ryan

(57) ABSTRACT

A rearview assembly for a vehicle includes a rearview device having a peripheral edge. A carrier plate is operably coupled to the rearview device. The carrier plate includes a peripheral wall with a forward edge and a rearward edge. The forward edge is substantially aligned with the peripheral edge of the rearview device. A housing includes a forward lip configured to abut the rearward edge of the peripheral wall to provide a substantially smooth exterior transition from the housing to the peripheral wall to the rearview device.

20 Claims, 7 Drawing Sheets

(56) References Cited

U.S. PATENT DOCUMENTS

| | | | |
|---|---|---|---|
| 5,448,397 | A | 9/1995 | Tonar |
| 5,649,756 | A | 7/1997 | Adams et al. |
| 5,679,283 | A | 10/1997 | Tonar |
| 5,682,267 | A | 10/1997 | Tonar |
| 5,689,370 | A | 11/1997 | Tonar |
| 5,742,026 | A | 4/1998 | Dickinson, Jr. |
| 5,790,298 | A | 8/1998 | Tonar |
| 5,803,579 | A | 9/1998 | Turnbull |
| 5,808,778 | A | 9/1998 | Bauer et al. |
| 5,818,625 | A | 10/1998 | Forgette et al. |
| 5,825,527 | A | 10/1998 | Forgette et al. |
| 5,837,994 | A | 11/1998 | Stam |
| 5,888,431 | A | 3/1999 | Tonar et al. |
| D410,607 | S | 6/1999 | Carter |
| 5,923,027 | A | 7/1999 | Stam |
| 5,923,457 | A | 7/1999 | Byker et al. |
| 5,928,572 | A | 7/1999 | Tonar et al. |
| 5,940,201 | A | 8/1999 | Ash et al. |
| 5,956,012 | A | 9/1999 | Turnbull et al. |
| 5,990,469 | A | 11/1999 | Bechtel |
| 5,998,617 | A | 12/1999 | Srinivasa |
| 6,002,511 | A | 12/1999 | Varaprasad |
| 6,008,486 | A | 12/1999 | Stam |
| 6,020,987 | A | 2/2000 | Baumann |
| 6,023,040 | A | 2/2000 | Zahavi |
| 6,023,229 | A | 2/2000 | Bugno et al. |
| 6,037,471 | A | 3/2000 | Srinivasa |
| 6,043,452 | A | 3/2000 | Bestenlehrer |
| 6,049,171 | A | 4/2000 | Stam |
| 6,051,956 | A | 4/2000 | Nakashimo |
| 6,062,920 | A | 5/2000 | Jordan |
| 6,064,508 | A | 5/2000 | Forgette et al. |
| 6,064,509 | A | 5/2000 | Tonar et al. |
| 6,068,380 | A | 5/2000 | Lynn et al. |
| 6,084,700 | A | 7/2000 | Knapp |
| 6,102,546 | A | 8/2000 | Carter |
| 6,111,683 | A | 8/2000 | Cammenga |
| 6,111,684 | A | 8/2000 | Forgette |
| 6,130,421 | A | 10/2000 | Bechtel |
| 6,130,448 | A | 10/2000 | Bauer et al. |
| 6,132,072 | A | 10/2000 | Turnbull |
| 6,140,933 | A | 10/2000 | Bugno |
| 6,166,848 | A | 12/2000 | Cammenga et al. |
| 6,170,956 | B1 | 1/2001 | Rumsey et al. |
| 6,188,505 | B1 | 2/2001 | Lomprey |
| 6,193,378 | B1 | 2/2001 | Tonar et al. |
| 6,193,912 | B1 | 2/2001 | Thieste |
| 6,195,194 | B1 | 2/2001 | Roberts et al. |
| 6,222,177 | B1 | 4/2001 | Bechtel |
| 6,224,716 | B1 | 5/2001 | Yoder |
| 6,229,435 | B1 | 5/2001 | Knapp |
| 6,239,898 | B1 | 5/2001 | Byker |
| 6,239,899 | B1 | 5/2001 | DeVries et al. |
| 6,244,716 | B1 | 6/2001 | Steenwyk |
| 6,246,507 | B1 | 6/2001 | Bauer |
| 6,247,819 | B1 | 6/2001 | Turnbull |
| 6,249,369 | B1 | 6/2001 | Theiste et al. |
| 6,255,639 | B1 | 7/2001 | Stam |
| 6,262,831 | B1 | 7/2001 | Bauer |
| 6,262,832 | B1 | 7/2001 | Lomprey |
| 6,268,950 | B1 | 7/2001 | Ash |
| 6,281,632 | B1 | 8/2001 | Stam |
| 6,291,812 | B1 | 9/2001 | Bechtel |
| 6,313,457 | B1 | 11/2001 | Bauer |
| 6,317,248 | B1 | 11/2001 | Agrawal et al. |
| 6,335,548 | B1 | 1/2002 | Roberts |
| 6,356,376 | B1 | 3/2002 | Tonar |
| 6,359,274 | B1 | 3/2002 | Nixon |
| 6,379,013 | B1 | 4/2002 | Bechtel |
| 6,392,783 | B1 | 5/2002 | Lomprey |
| 6,402,328 | B1 | 6/2002 | Bechtel |
| 6,403,942 | B1 | 6/2002 | Stam |
| 6,407,468 | B1 | 6/2002 | LeVesque et al. |
| 6,407,847 | B1 | 6/2002 | Poll et al. |
| 6,420,800 | B1 | 7/2002 | LeVesque |
| 6,426,485 | B1 | 7/2002 | Bulgajewski |
| 6,429,594 | B1 | 8/2002 | Stam |
| 6,441,943 | B1 | 8/2002 | Roberts |
| 6,465,963 | B1 | 10/2002 | Turnbull |
| 6,469,739 | B1 | 10/2002 | Bechtel |
| 6,471,362 | B1 | 10/2002 | Carter |
| 6,504,142 | B2 | 1/2003 | Nixon |
| 6,512,624 | B2 | 1/2003 | Tonar |
| 6,521,916 | B2 | 2/2003 | Roberts |
| 6,523,976 | B1 | 2/2003 | Turnbull |
| 6,535,126 | B2 | 3/2003 | Lin et al. |
| 6,545,794 | B2 | 4/2003 | Ash |
| 6,587,573 | B1 | 7/2003 | Stam |
| 6,606,183 | B2 | 8/2003 | Ikai et al. |
| 6,614,579 | B2 | 9/2003 | Roberts et al. |
| 6,635,194 | B2 | 10/2003 | Kloeppner |
| 6,650,457 | B2 | 11/2003 | Busscher et al. |
| 6,657,767 | B2 | 12/2003 | Bauer |
| 6,700,692 | B2 | 3/2004 | Tonar |
| 6,774,988 | B2 | 8/2004 | Stam |
| 6,781,738 | B2 | 8/2004 | Kikuchi et al. |
| 6,816,297 | B1 | 11/2004 | Tonar |
| 6,861,809 | B2 | 3/2005 | Stam |
| 6,870,656 | B2 | 3/2005 | Tonar et al. |
| 6,968,273 | B2 | 11/2005 | Ockerse |
| 7,042,616 | B2 | 5/2006 | Tonar et al. |
| 7,064,882 | B2 | 6/2006 | Tonar |
| 7,287,868 | B2 | 10/2007 | Carter |
| 7,324,261 | B2 | 1/2008 | Tonar et al. |
| 7,342,707 | B2 | 3/2008 | Roberts |
| 7,417,717 | B2 | 8/2008 | Pack |
| 7,592,563 | B2 | 9/2009 | Wissenbach |
| 7,663,798 | B2 | 2/2010 | Tonar |
| 7,688,495 | B2 | 3/2010 | Tonar et al. |
| 7,706,046 | B2 | 4/2010 | Bauer et al. |
| 7,746,534 | B2 | 6/2010 | Tonar et al. |
| 7,817,020 | B2 | 10/2010 | Turnbull et al. |
| 7,821,696 | B2 | 10/2010 | Tonar et al. |
| 7,830,583 | B2 | 11/2010 | Neuman et al. |
| 7,864,399 | B2 | 1/2011 | McCabe et al. |
| 7,978,393 | B2 | 7/2011 | Tonar et al. |
| 8,035,881 | B2 | 10/2011 | Luten et al. |
| 2007/0019426 | A1* | 1/2007 | Uken ............................ 362/494 |
| 2008/0302657 | A1 | 12/2008 | Luten et al. |
| 2009/0296190 | A1 | 12/2009 | Anderson et al. |
| 2010/0110553 | A1 | 5/2010 | Anderson et al. |
| 2010/0277786 | A1 | 11/2010 | Anderson et al. |
| 2011/0168687 | A1 | 7/2011 | Door |
| 2011/0176323 | A1 | 7/2011 | Skiver et al. |
| 2011/0181727 | A1 | 7/2011 | Weller et al. |
| 2012/0038964 | A1 | 2/2012 | De Wind et al. |
| 2012/0069444 | A1 | 3/2012 | Campbell et al. |
| 2012/0229882 | A1 | 9/2012 | Fish, Jr. et al. |
| 2012/0236388 | A1 | 9/2012 | De Wind et al. |
| 2014/0022390 | A1 | 1/2014 | Blank et al. |

\* cited by examiner

REARVIEW ASSEMBLY WITH EXPOSED CARRIER PLATE

CROSS-REFERENCE TO RELATED APPLICATION

This application claims the benefit of and priority to U.S. Provisional Patent Application No. 61/749,012, filed on Jan. 4, 2013, entitled "REARVIEW ASSEMBLY WITH BOTTOM MOUNTED BUTTONS AND EXPOSED CARRIER PLATE," the entire disclosure of which is hereby incorporated herein by reference.

BACKGROUND OF THE INVENTION

The present invention generally relates to a rearview assembly that includes an exposed carrier plate, and can also include bottom mounted buttons that use Hall effect switches to enable particular features of the rearview assembly.

SUMMARY OF THE PRESENT INVENTION

One aspect of the present invention includes a rearview assembly for a vehicle having a rearview device including a peripheral edge. A carrier plate is operably coupled to the rearview device. The carrier plate includes a peripheral wall with a forward edge and a rearward edge. The forward edge is substantially aligned with the peripheral edge of the rearview device. A housing includes a forward lip configured to abut the rearward edge of the peripheral wall to provide a substantially smooth exterior transition from the housing to the peripheral wall to the rearview device.

Another aspect of the present invention includes a rearview assembly for a vehicle having a rearview device including a peripheral edge. A carrier plate is operably coupled to the rearview device. The carrier plate includes a peripheral wall with a forward edge and a rearward edge. The forward edge is substantially aligned with the peripheral edge of the rearview device. A housing includes a forward lip configured to abut the rearward edge of the peripheral wall to provide a substantially smooth exterior transition from the housing to the peripheral wall to the rearview device. A plurality of buttons are disposed on a bottom side of the housing proximate the peripheral wall of the carrier plate and the housing.

Yet another aspect of the present invention includes a rearview assembly for a vehicle having a rearview device including a peripheral edge. A carrier plate is operably coupled to the rearview device. The carrier plate includes a peripheral wall with a forward edge and a rearward edge. The forward edge is substantially aligned with the peripheral edge of the rearview device. A housing includes a forward lip configured to abut the rearward edge of the peripheral wall to provide a substantially smooth exterior transition from the housing to the peripheral wall to the rearview device. A wire harness slot is disposed below a mount aperture configured to receive a mount that supports the housing in a predetermined position relative to a windshield of the vehicle. The wire harness slot is in communication with the mount aperture and is configured to receive a wire harness.

Still yet another aspect of the present invention includes a rearview assembly for a vehicle includes a rearview device having a peripheral edge that is aligned with a peripheral wall of a carrier plate. The carrier plate supports the rearview device. A housing includes a forward lip configured to abut the peripheral wall of the carrier plate to provide a substantially smooth exterior transition and also a gripping surface between the peripheral wall and the housing.

These and other aspects, objects, and features of the present invention will be understood and appreciated by those skilled in the art upon studying the following specification, claims, and appended drawings.

DETAILED DESCRIPTION OF EMBODIMENTS

Figure 1:
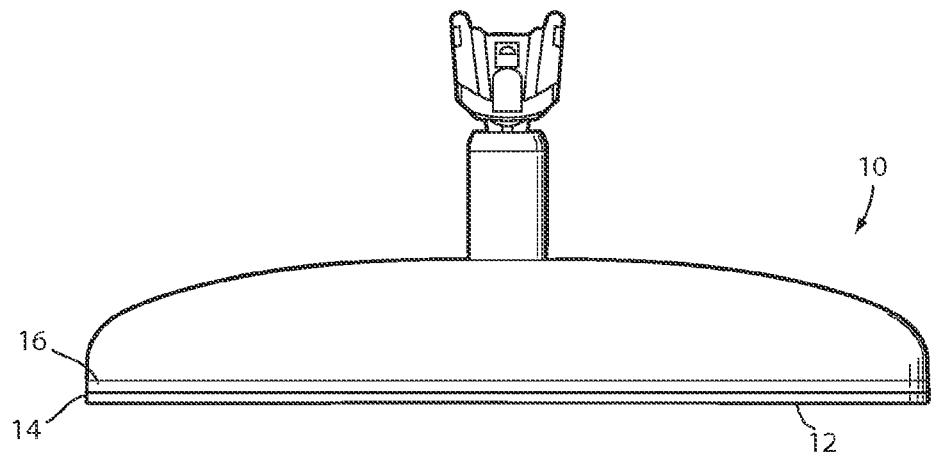
FIG. 1 is a top plan view of one embodiment of a rearview assembly of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-5A, reference numeral 10 generally designates a rearview assembly for a vehicle having a rearview device 12 including a peripheral edge 14. A carrier plate 16 is operably coupled to the rearview device 12. The carrier plate 16 includes a peripheral wall 18 with a forward edge 20 and a rearward edge 22. The forward edge 20 is substantially aligned with the peripheral edge 14 of the rearview device 12. A housing 24 includes a forward lip 26 configured to abut the rearward edge 22 of the peripheral wall 18 to provide a substantially smooth exterior transition from the housing 24 to the peripheral wall 18 to the rearview device 12. A plurality of buttons 30 are disposed on a bottom side 32 of the housing 24 proximate the peripheral wall 18 of the carrier plate 16 and the housing 24.

With reference again to the embodiment illustrated in FIGS. 1-5A, the rearview assembly 10 is generally designed to be supported on a windshield of a vehicle via a mounting button. The mounting button is configured to engage a mount that is fixedly connected with or pivotally connected with a barrel. The barrel is pivotally connected with a ball mount that is operably coupled with the rearview assembly 10. The ball mount may be defined as part of the housing 24, or formed on a rear wall disposed inside the housing 24. Other possible constructions for the ball mount of the housing 24 are also contemplated. In the illustrated embodiment, the mount is configured to engage a button being in sliding operation. However, it is also contemplated that the mount may engage with the button in a variety of other manners, including twist-fit and interference connections. It is generally contemplated that the mount button will be operably coupled with the windshield of the vehicle via an adhesive. It is also contemplated that other rearview assembly features may be included with the rearview assembly 10. Some of these additional devices may include light sensors, rain sensors, compasses, microphones, etc.

Figure 5:
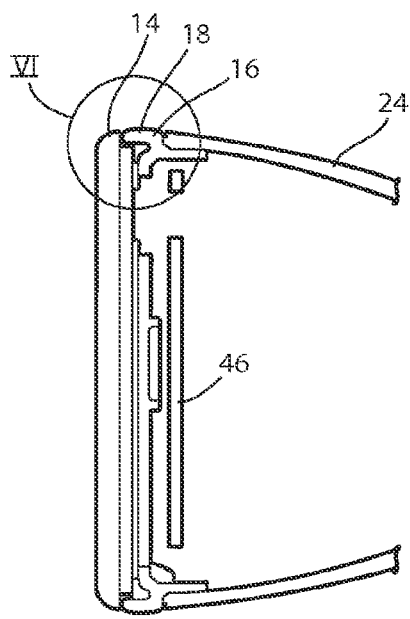
FIG. 5 is a partial side cross-sectional elevational view of the rearview assembly of FIG. 1.
Figure 5A:
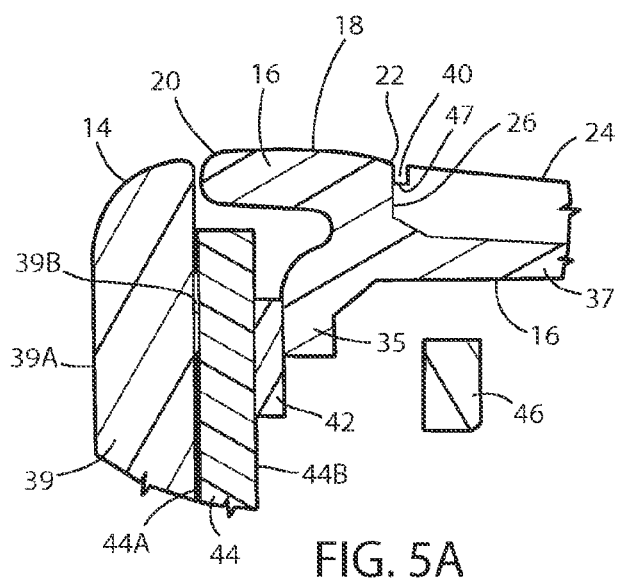
FIG. 5A is an enlarged cross-sectional elevational view of area VA of FIG. 5.

As illustrated in FIG. 5A, the carrier plate 16 of the rearview assembly 10 includes the forward edge 20 that extends around the peripheral edge 14 of the rearview device 12. Because a portion of the carrier plate 16 is exposed, a tighter fit around the peripheral edge 14 of the rearview device 12 can be maintained. Accordingly, any gap between the carrier plate 16 and the rearview device 12 can be minimized.

With reference to the embodiment depicted in FIGS. 1-5A, the peripheral edge 14 of the rearview device 12 may be ground to create an aesthetically pleasing rearview assembly 10. Consequently, when grasping the rearview assembly 10, a user will not feel the edge of an interface (gap) between the housing 24 and the rearview device 12 as is sometimes noticeable when the rearview device 12 abuts directly against the housing 24.

With reference to the embodiment illustrated in FIGS. 5 and 5A, the carrier plate 16 may include a rounded peripheral wall 18 or a substantially flat peripheral wall 18. Further, the peripheral wall 18 may be generally flush with the forward lip 26 of the housing 24. Alternatively, the peripheral wall 18 may protrude slightly outwardly from the periphery of the housing 24, the peripheral edge 14 of the rearview device 12, or both the periphery of the housing 24 and the peripheral edge 14 of the rearview device 12, to provide an increased surface area for gripping the carrier plate 16, and consequently being able to move or rotate the rearview assembly 10 relative to a front windshield of the vehicle. In one embodiment, the peripheral wall 18 protrudes approximately 0.4 mm outwardly relative to the peripheral edge 14 of the rearview device 12. It is also contemplated that the peripheral wall 18 of the carrier plate 16 may be constructed from a material that includes a higher coefficient of friction than the periphery 14 of the rearview device 12, thus aiding a user in obtaining and maintaining a gripping contact with the carrier plate 16, and consequently the rearview assembly 10. Alternatively, the peripheral wall 18 may be etched, knurled, or include a patterned surface that aids a user in gripping and maintaining a grip on the carrier plate 16 to manipulate and move the rearview assembly 10. The material from which the peripheral wall 18 of the carrier plate 16 is constructed may be the same as or different from other portions of the carrier plate 16, as generally outlined herein.

As shown in the embodiment illustrated in FIG. 5A, the carrier plate 16 includes a forward wall 35 that abuts or nearly abuts a rear edge of the rearview device 12. The carrier plate 16 also includes a rearwardly extending flange 37 configured for abutting engagement with an inside wall of the housing 24. The rearview device 12 includes a front substrate 39 with a first surface 39A and a second surface 39B, as well as a rear substrate 44 with a third surface 44A and a fourth surface 44B. A dimmable material is disposed between the front substrate 39 and the rear substrate 44. The carrier plate 16 also includes a back wall 46, which has a configuration that is complementary with a receiving configuration of the housing 24. A grasping slot 40, such as that shown in FIG. 5A, may be provided between the housing 24 and the carrier plate 16. As illustrated in FIG. 5A, the grasping slot 40 provides a mild gripping surface so that a user can manipulate the housing 24, and consequently the entirety of the rearview assembly 10. The grasping slot 40 is generally defined by the rearward edge 22 and a groove 47 formed in the forward lip 26 of the housing 24. It is also contemplated that the grasping slot 40 could be defined in only the peripheral wall 18, or could be provided solely in a portion of the housing 24 spaced a predetermined distance from the peripheral wall 18. The carrier plate 16 includes a foam portion 42 that abuts and secures the rear substrate 44 of the rearview device 12 against the forward wall 35 of the carrier plate 16. Alternatively, an adhesive may be used to secure the rear substrate 44 of the rearview device 12 to the carrier plate 16.

Figure 6:
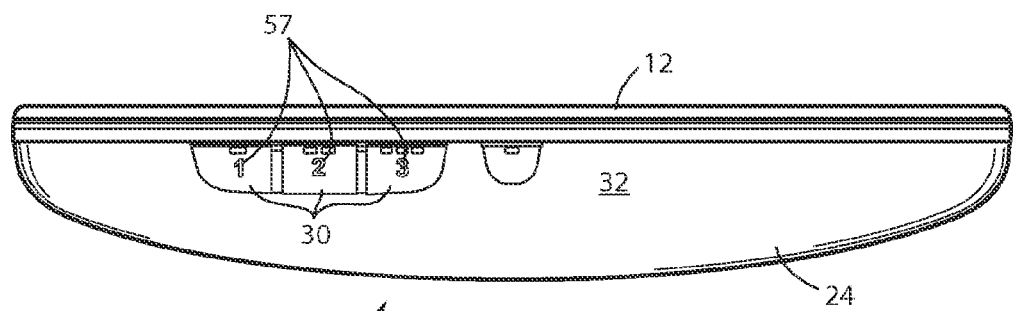
FIG. 6 is a bottom elevational view of another embodiment of a rearview assembly of the present invention.
Figure 7:
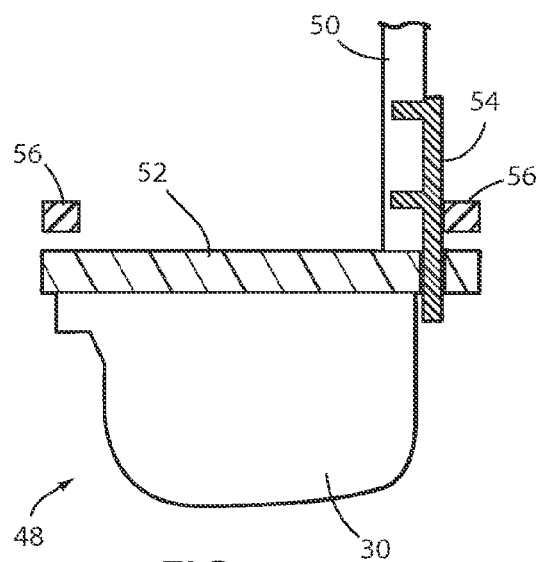
FIG. 7 is a partial side elevational view of one embodiment of a switch assembly of the present invention.
Figure 8:
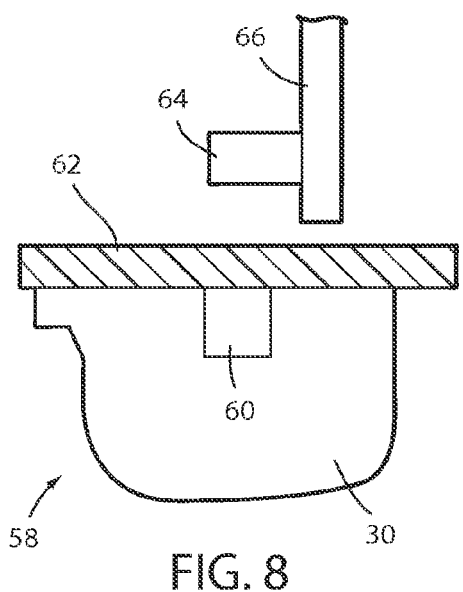
FIG. 8 is a partial side cross-sectional elevational view of another embodiment of a switch assembly of the present invention.

Referring now to FIGS. 6-8, the plurality of buttons 30 are shown mounted through the bottom side 32 of the housing 24. In one embodiment of a button assembly 48, as illustrated in FIG. 7, the button 30 is supported by and attached to a printed circuit board 50. The printed circuit board 50 is directly or indirectly coupled with a component card or switchcard 52, with the planar surface of the printed circuit board 50 and the planar surface of the switchcard 52 meeting at a generally perpendicular angle. The switchcard 52 is configured generally parallel to the button 32, and the printed circuit board 50 extends into the housing 24. In the embodiment depicted in FIG. 7, a compliant pin 54 is positioned at the button assembly 48, and is configured to engage the printed circuit board 50 when a user selects a particular button 30, causing the printed circuit board 50 to travel with the button 30 as it is depressed. The compliant pin 54 mechanically links the components of the button assembly 48 such that the printed circuit board 50 is engaged via the compliant pin 54 when the button 30 is depressed. The switchcard 52 is supported by ribs 56 defined by the housing 24. The ribs 56 also limit the upward motion of the button 30 when it is depressed.

Figure 2:
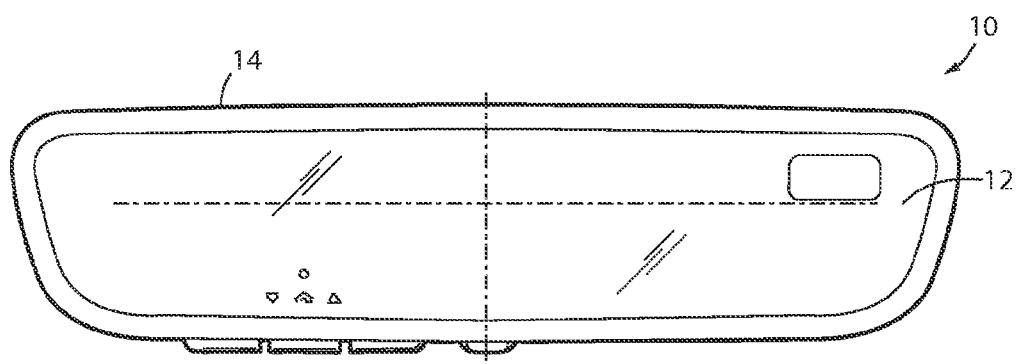
FIG. 2 is a front elevational view of the rearview assembly of FIG. 1.
Figure 3:
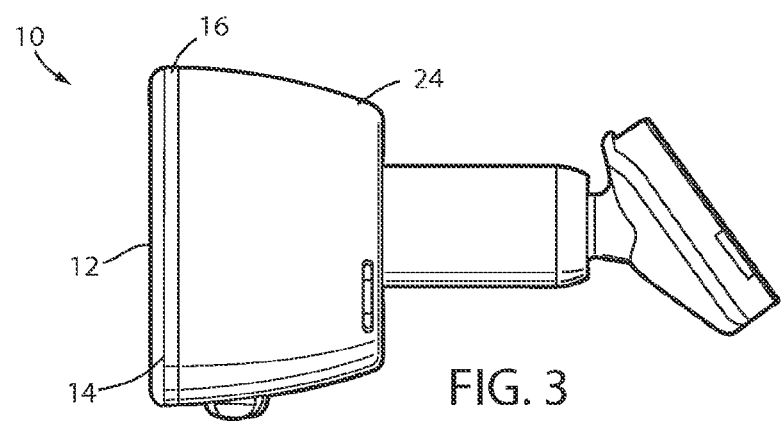
FIG. 3 is a side plan view of the rearview assembly of FIG. 1.
Figure 4:
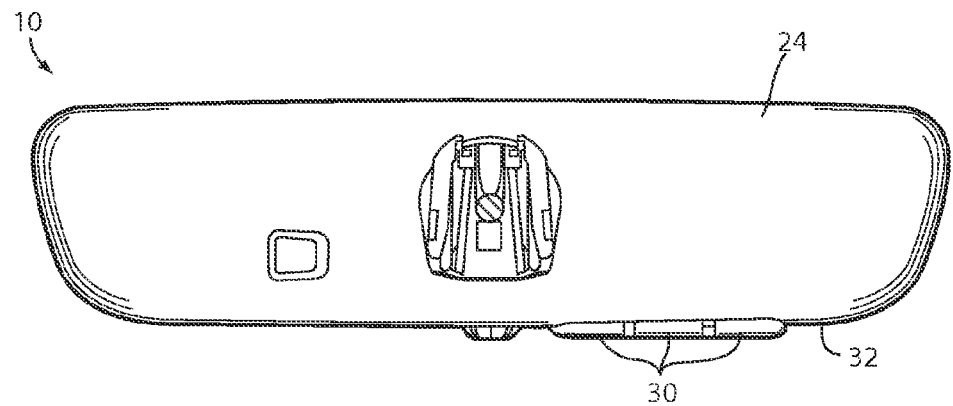
FIG. 4 is a rear plan view of the rearview assembly of FIG. 1.

With reference again to FIG. 6, it is generally contemplated that icons 57 disposed on the buttons 30 may be defined by the use of an appliqué or ink-jetting process applied to the buttons 30. Consequently, a very defined and specific icon pattern can be obtained on the buttons 30. The appliqué and ink-jet process may be used to apply the icons 57 or a compass opening as shown in FIG. 2 on the front side of the rearview device 12, which may be glass, plastic, etc.

Alternatively, as shown in FIG. 8, another embodiment of the button assembly 48 includes a magnet 60 that may be embedded inside one or more of the buttons 30, which are mounted to a moveable plastic holder 62. A Hall effect sensor 64 is disposed on a main printed circuit board 66 and configured to sense movement of a particular magnet 60 in a particular button 30 upon selection by a user. Pressing a particular button 30 moves the relevant magnet 60 closer to the Hall effect sensor 64, thereby activating the Hall effect sensor 64 and causing a change in the state of the button 30. This configuration eliminates the need for switchcards, jumper harnesses, and flex cables. Additionally, there is less risk of components being damaged compared to tact switches. Furthermore, the overall design is simplified. This configuration is believed to be superior to right angle tact switches, carbon pads with daughter cards, and switchcard assemblies with tact switches.

Figure 9:
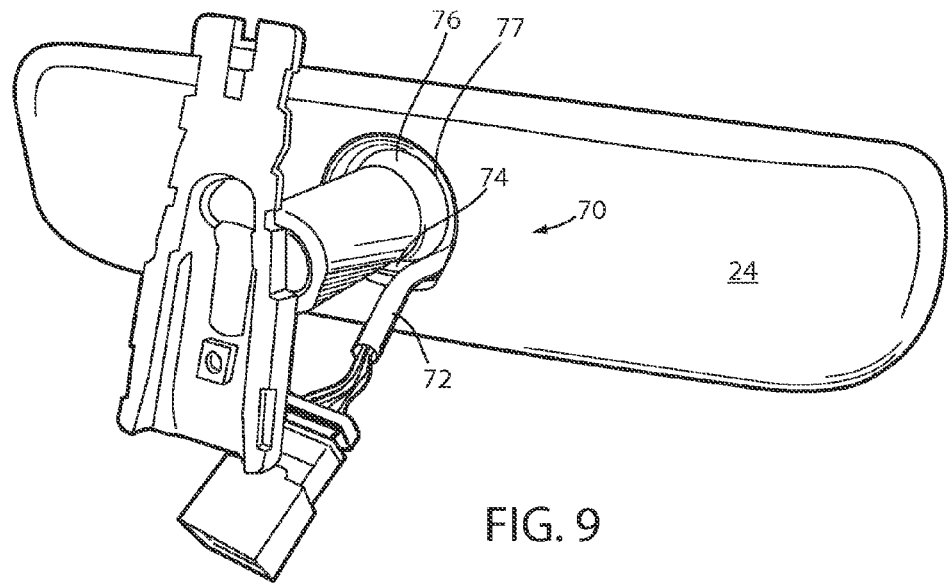
FIG. 9 is a top rear perspective view of one embodiment of a wire guide arrangement of the present invention.
Figure 9A:
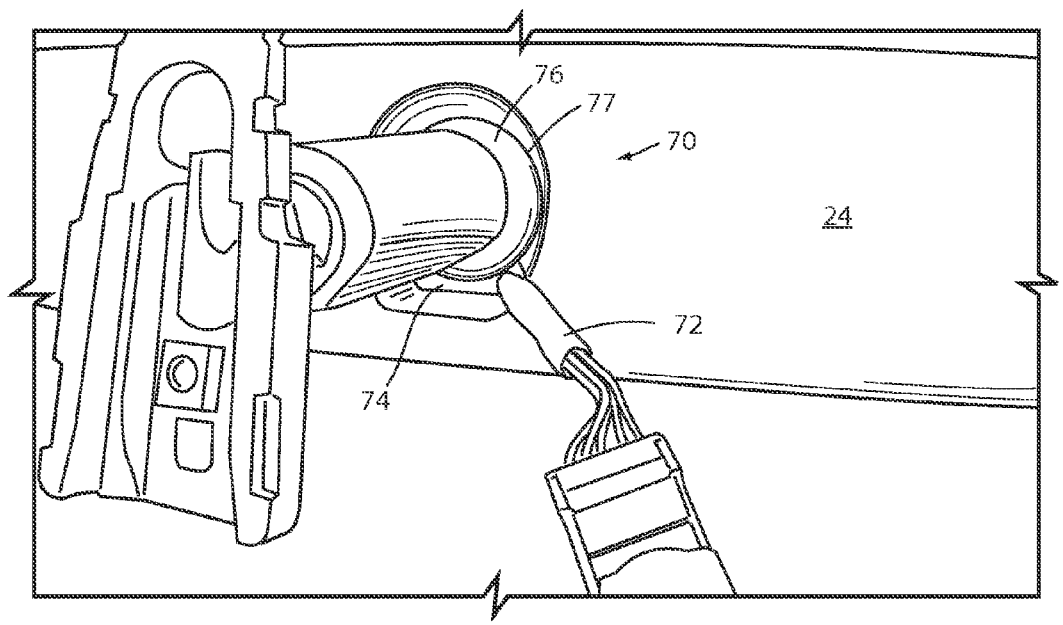
FIG. 9A is a rear side perspective view of the wire guide arrangement of FIG. 9.
Figure 10:
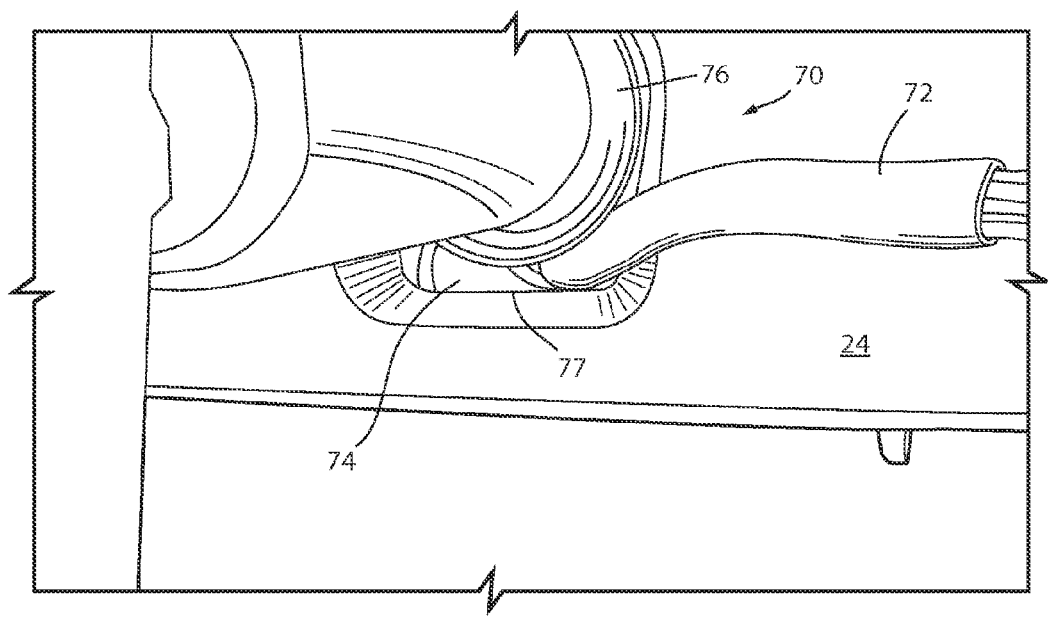
FIG. 10 is an enlarged side perspective view of the wire guide arrangement of FIG. 9.

Referring to now to FIGS. 9-10, one embodiment of a rearview assembly 10, a wire guide arrangement 70 includes a wire harness 72 that extends through an enlarged wire harness slot 74 disposed in the housing 24 of the rearview assembly 10. The wire harness slot 74 is positioned below a ball mount 76 of the rearview assembly 10, such that the wire harness 72 does not interfere with adjustment of the position of the rearview assembly 10 after installation. In the illustrated embodiment, the wire harness slot 74 extends horizontally across the width of the ball mount 76 below the ball mount 76. However, it is also contemplated that the wire harness slot 74 could extend vertically adjacent to the ball mount 76, or extend horizontally above the ball mount 76. A mount aperture 77 is disposed in a rear wall of the housing 24 and the wire harness slot 74 is disposed below the mount aperture 77. The wire harness slot 74 is configured to transition the wire harness 72 from inside the housing 24 to a position outside the housing 24 without interfering with a range of motion provided by the ball mount 76.

Figure 11:
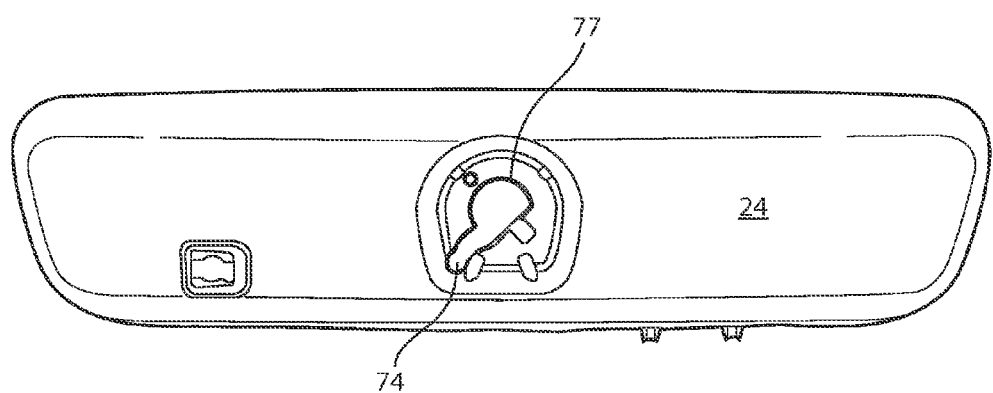
FIG. 11 is a rear plan view of one embodiment of a housing for a rearview assembly of the present invention.
Figure 11A:
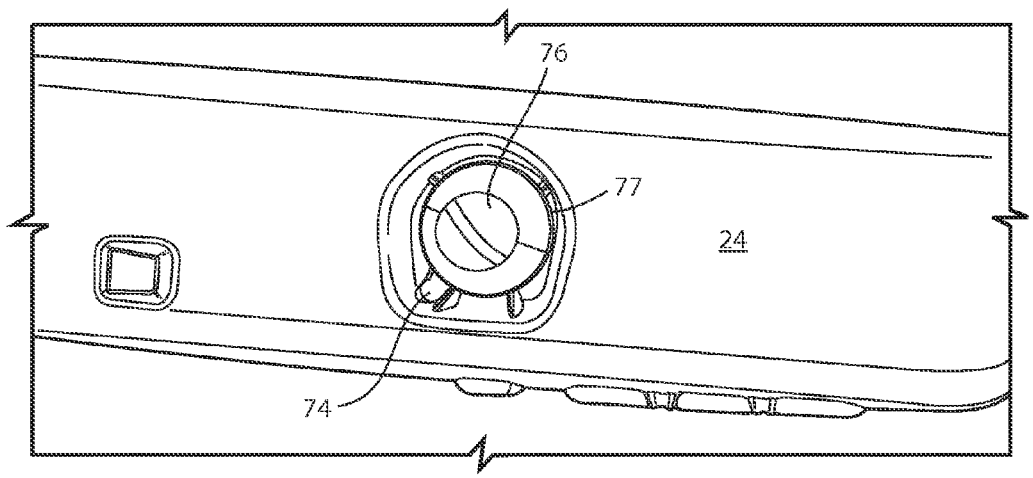
FIG. 11A is an enlarged rear plan view of the housing for the rearview assembly shown in FIG. 11.

Referring now to FIGS. 11-11A, in another embodiment of a rearview assembly 10, the harness slot 74 extends generally diagonally downwardly from the portion of the mount aperture 77 which accommodates the ball mount 76. In this orientation, the wire harness slot 74 also permits passage of the wire harness 72 from inside the housing 24 to a position outside the housing 24 without interfering with the range of motion provided by the ball mount 76.

Figure 12:
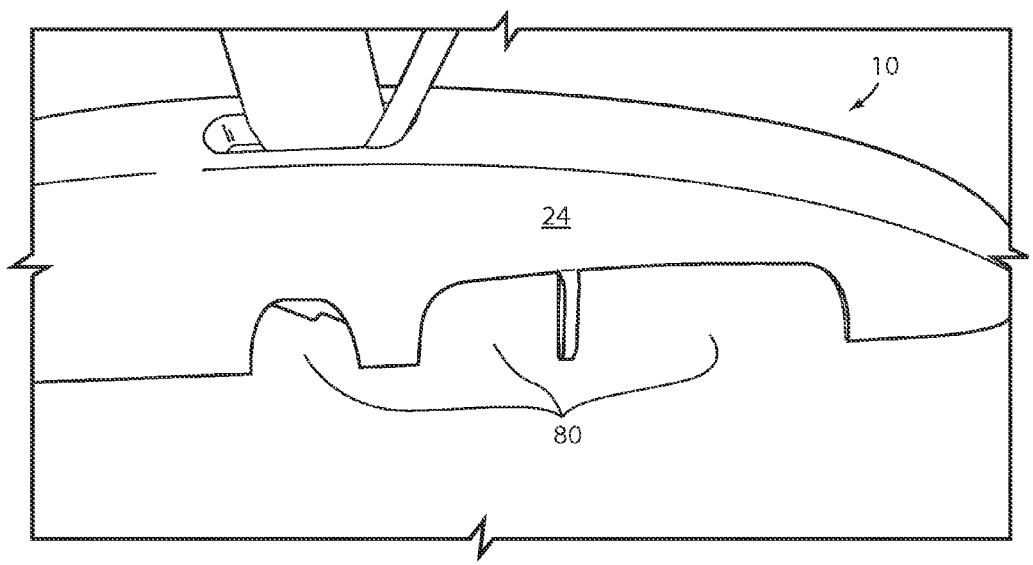
FIG. 12 is a bottom plan view of one embodiment of a housing of the rearview assembly of the present invention.
Figure 13:
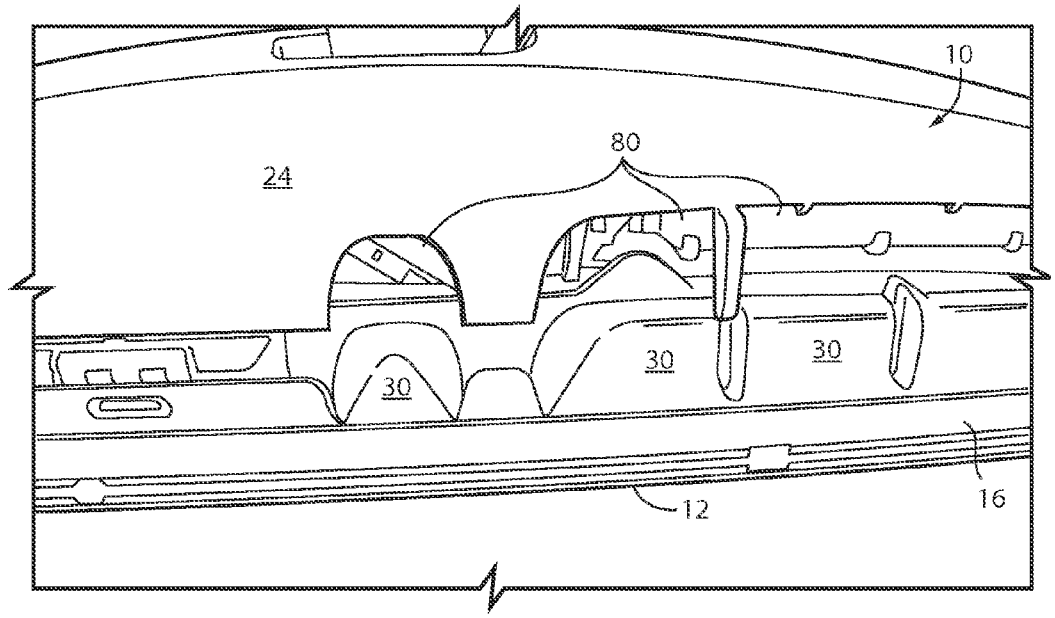
FIG. 13 is a bottom plan view of the housing of FIG. 12 prior to connection with a rearview device.
Figure 14:
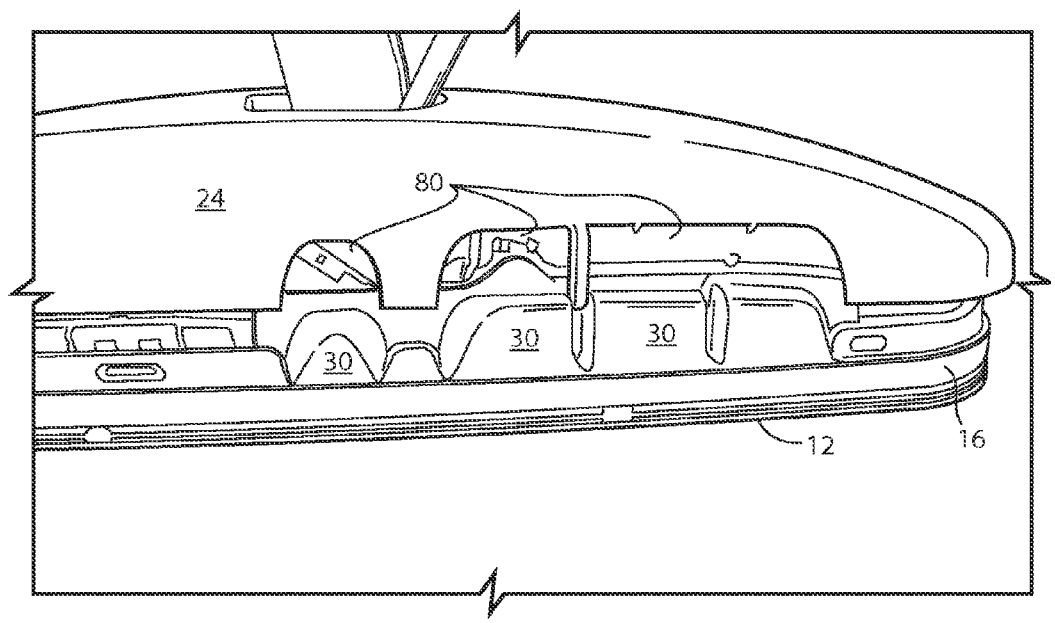
FIG. 14 is a bottom plan view of the housing of FIG. 12 during connection with the rearview device.

Referring now to FIGS. 12-14, the bottom wall of the housing 24 may include a variety of button slots 80 configured to receive the buttons 30. During construction of the rearview assembly 10, the buttons 30 are secured with the printed circuit board 50, which is secured to the carrier plate 16 as shown in the embodiment depicted in FIGS. 5 and 5A. The buttons 30 extend orthogonally relative to the printed circuit board 50 and the rearview device 12. The housing 24 is then aligned with the buttons 30 and moved into abutting contact with the carrier plate 16 and rearview device 12. Accordingly, the buttons 30 are not secured by the housing 24, but are rather secured with the printed circuit board 50.

The present invention may be used with a mounting system such as that described in U.S. Pat. Nos. 8,201,800; 8,210,695; U.S. patent application Ser. Nos. 13/600,496; 13/527,375; 13/431,657; 13/402,701; 12/187,019, and U.S. Provisional Patent Application Nos. 61/709,716; 61/707,676; and 61/704, 869, which are hereby incorporated herein by reference in their entirety. Further, the present invention may be used with a rearview packaging assembly such as that described in U.S. Pat. No. 8,264,761; U.S. patent application Ser. Nos. 13/567, 363; 13/405,697; 13/402,701; and 13/171,950, and U.S. Provisional Patent Application Nos. 61/707,625; and 61/590, 259, which are hereby incorporated herein by reference in their entirety. Additionally, it is contemplated that the present invention can include a bezel such as that described in U.S. Pat. Nos. 8,201,800; 8,210,695; and U.S. patent application Ser. No. 13/271,745, which is hereby incorporated herein by reference in its entirety.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A rearview assembly for a vehicle comprising:
   a rearview device including a peripheral edge;
   a carrier plate operably coupled with and disposed directly behind rearview device, the carrier plate including an exposed peripheral wall with a forward edge and a rearward edge, wherein the forward edge is substantially aligned with the peripheral edge of the rearview device; and a housing including a forward lip configured to abut the rearward edge of the exposed peripheral wall to provide a substantially smooth exterior transition from the housing to the exposed peripheral wall to the rearview device.

2. The rearview assembly of claim 1, further comprising:
a plurality of button slots defined along the forward lip of the housing.

3. The rearview assembly of claim 1, further comprising:
at least one button extending through the housing; and
one of a switchcard and a component card proximate the at least one button and generally configured to engage a printed circuit board via a compliant pin.

4. The rearview assembly of claim 1, wherein the peripheral edge of the rearview device is rounded.

5. The rearview assembly of claim 1, wherein the carrier plate includes a rearwardly extending flange configured for abutting engagement with an inside wall of the housing.

6. The rearview assembly of claim 1, wherein the carrier plate includes a support wall that extends behind the rearview device.

7. The rearview assembly of claim 1, further comprising:
a mount aperture disposed in a rear wall of the housing and a wire harness slot disposed below the mount aperture, the wire harness slot configured to transition a wire harness from inside the housing to a position outside the housing without interfering with a range of motion of the housing relative to the mount aperture.

8. A rearview assembly for a vehicle comprising:
a rearview device including a peripheral edge;
a carrier plate supporting the rearview device, the carrier plate including an exposed peripheral wall with a forward edge and a rearward edge, wherein the forward edge abuts and is substantially aligned with the peripheral edge of the rearview device;
a housing including a forward lip configured to abut the rearward edge of the exposed peripheral wall to provide a substantially smooth exterior transition from the housing to the exposed peripheral wall to the rearview device; wherein the carrier plate extends behind the rearview device; and
a plurality of buttons disposed on a bottom side of the housing proximate the exposed peripheral wall of the carrier plate and the housing.

9. The rearview assembly of claim 8, further comprising:
a plurality of button slots defined along the forward lip of the housing.

10. The rearview assembly of claim 8, further comprising:
at least one button extending through the housing; and
a switchcard proximate the at least one button and generally configured to engage a printed circuit board via a compliant pin.

11. The rearview assembly of claim 8, wherein the peripheral edge of the rearview device is rounded.

12. The rearview assembly of claim 8, wherein the carrier plate includes a rearwardly extending flange configured for abutting engagement with an inside wall of the housing.

13. The rearview assembly of claim 8, wherein the carrier plate includes a support wall that extends behind the rearview device.

14. The rearview assembly of claim 8, further comprising:
a mount aperture disposed in a rear wall of the housing and a wire harness slot disposed below the mount aperture, the wire harness slot configured to transition a wire harness from inside the housing to a position outside the housing without interfering with a range of motion of the housing relative to the mount aperture.

15. A rearview assembly for a vehicle comprising:
a rearview device including a peripheral edge;
a carrier plate operably coupled with and disposed directly behind the rearview device, the carrier plate including an exposed peripheral wall with a forward edge and a rearward edge, wherein the forward edge is substantially aligned with the peripheral edge of the rearview device;
a housing including a forward lip configured to abut the rearward edge of the exposed peripheral wall to provide a substantially smooth exterior transition from the housing to the exposed peripheral wall to the rearview device; and
a wire harness slot disposed below a mount aperture configured to receive a mount that supports the housing in a predetermined position relative to a windshield of the vehicle, the wire harness slot being in communication with the mount aperture and configured to receive a wire harness.

16. The rearview assembly of claim 15, further comprising:
at least one button extending through the housing; and
a switchcard proximate the at least one button and generally configured to engage a printed circuit board via a compliant pin.

17. The rearview assembly of claim 16, wherein a planar extent of the printed circuit board is generally orthogonal to a planar extent of the switchcard.

18. The rearview assembly of claim 15, wherein a grasping slot is defined between the carrier plate and the housing.

19. The rearview assembly of claim 16, further comprising:
a plurality of buttons that protrude from the housing, the plurality of buttons being supported by the printed circuit board and free from secure engagement with the housing.

20. The rearview assembly of claim 1, wherein the peripheral wall of the carrier plate extends passed the glass approximately 0.4 millimeters.

* * * * *

UNITED STATES PATENT AND TRADEMARK OFFICE
CERTIFICATE OF CORRECTION

| | | |
|---|---|---|
| PATENT NO. | : 9,327,648 B2 | Page 1 of 1 |
| APPLICATION NO. | : 14/147369 | |
| DATED | : May 3, 2016 | |
| INVENTOR(S) | : Sloterbeek et al. | |

It is certified that error appears in the above-identified patent and that said Letters Patent is hereby corrected as shown below:

In the claims,

Col. 6, claim 1, line 63;

After "behind" insert --the--;

Col. 7, claim 8, line 39;

";" should be --,--.

Signed and Sealed this
Second Day of August, 2016

Michelle K. Lee
*Director of the United States Patent and Trademark Office*